(12) United States Patent  (10) Patent No.: US 8,736,421 B2
Abe                        (45) Date of Patent:     May 27, 2014

(54) BIOMETRIC INFORMATION PROCESSING APPARATUS AND BIOMETRIC INFORMATION PROCESSING METHOD

(75) Inventor: Narishige Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 13/600,878

(22) Filed: Aug. 31, 2012

(65) Prior Publication Data

US 2012/0319817 A1    Dec. 20, 2012

Related U.S. Application Data

(63) Continuation of application No. PCT/JP2010/053249, filed on Mar. 1, 2010.

(51) Int. Cl.
    *H04Q 1/00*    (2006.01)
(52) U.S. Cl.
    USPC .......................... 340/5.82; 340/5.52; 382/124
(58) Field of Classification Search
    None
    See application file for complete search history.

(56) References Cited

U.S. PATENT DOCUMENTS

| 5,608,811 A | 3/1997 | Kamei |
| 6,466,685 B1 | 10/2002 | Fukui et al. |
| 2007/0189586 A1 | 8/2007 | Monden |
| 2010/0266168 A1* | 10/2010 | Wang et al. ............ 382/124 |
| 2013/0038426 A1* | 2/2013 | Yamada .................. 340/5.82 |

FOREIGN PATENT DOCUMENTS

| JP | 04-052975 | 2/1992 |
| JP | 05-108805 | 4/1993 |
| JP | 05-181956 | 7/1993 |
| JP | 11-154230 | 6/1999 |
| JP | 2000-020725 | 1/2000 |
| JP | 2000-030065 | 1/2000 |
| JP | 2003-036441 | 2/2003 |
| JP | 3479871 | 10/2003 |
| JP | 2005-202673 | 7/2005 |
| JP | 2005-0258555 | 9/2005 |
| JP | 2007-004532 | 1/2007 |
| JP | 2007-011764 | 1/2007 |
| JP | 2007-041925 | 2/2007 |
| JP | 4029412 | 1/2008 |

OTHER PUBLICATIONS

Umut Uludag et al, "Biometric template selection and update: a case study in fingerprints", Pattern recognition 37 (2004) pp. 1533-1542.
International Search Report for PCT/JP2010/053249, mailed Mar. 23, 2010.
English Translation of the International Preliminary Report on Patentability issued Sep. 13, 2012 in corresponding International Patent Application No. PCT/JP2010/053249.

* cited by examiner

*Primary Examiner* — Hai Phan
*Assistant Examiner* — Ojiako Nwugo
(74) *Attorney, Agent, or Firm* — Staas & Halsey LLP

(57) ABSTRACT

A biometric information processing apparatus includes: a calculation unit that calculates the direction of each of characteristic lines included in biometric information extracted from a user; a smoothing unit that smoothes each of the characteristic lines; a difference calculation unit that calculates a difference between the direction of each of the characteristic lines and the direction of each of the smoothed characteristic lines; a detection unit that detects, as a change candidate area, a potentially changeable area in the biometric information based on each of the calculated differences; and an estimation unit that estimates the future authentication accuracy using the biometric information, based on the detected change candidate area.

6 Claims, 8 Drawing Sheets

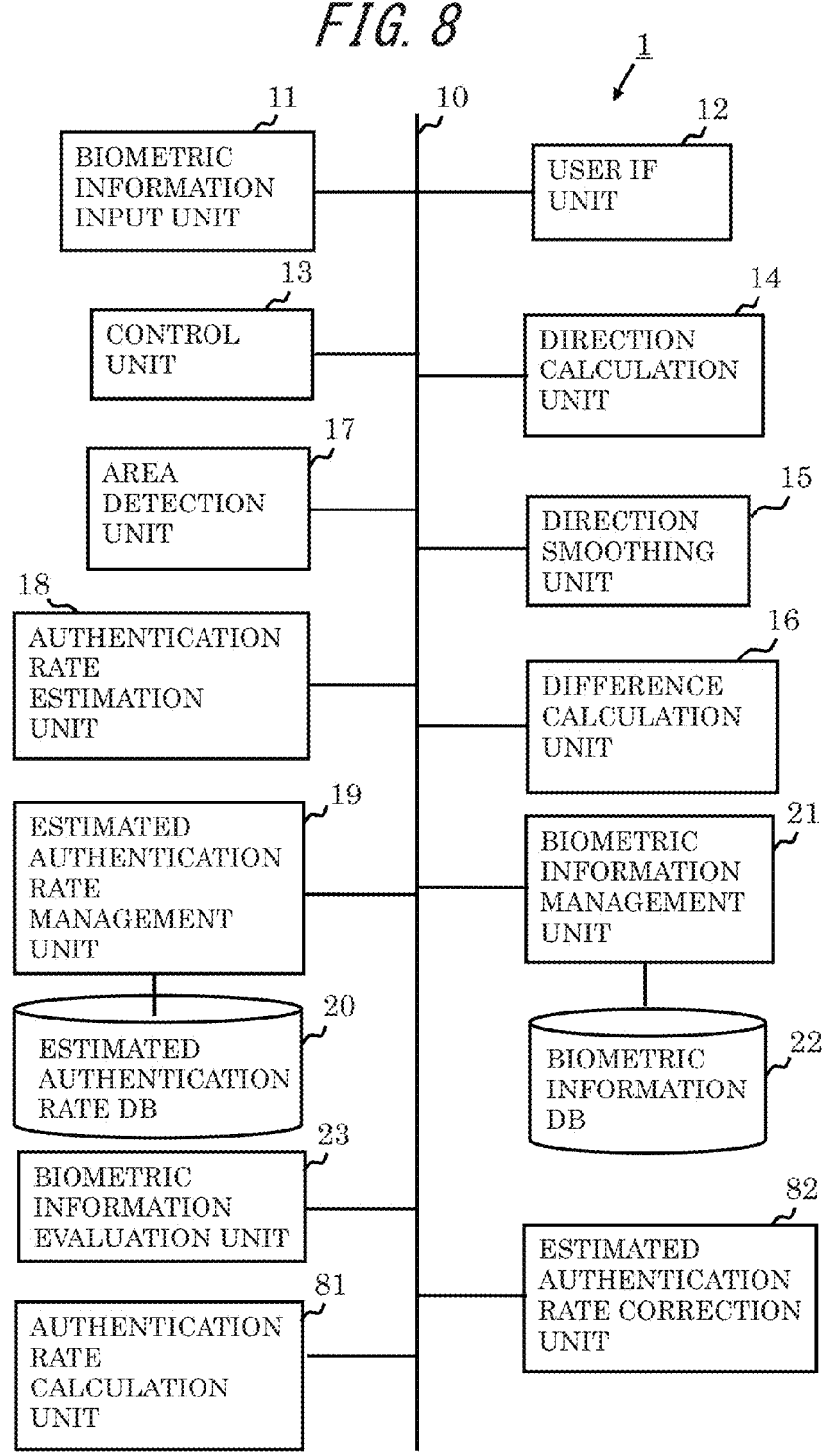

BIOMETRIC INFORMATION PROCESSING APPARATUS AND BIOMETRIC INFORMATION PROCESSING METHOD

CROSS-REFERENCE TO RELATED APPLICATION

This application is a continuation application of International Application PCT/JP2010/053249, filed on Mar. 1, 2010, and designated the U.S., the entire contents of which are incorporated herein by reference.

FIELD

The present invention relates to biometric information processing technique.

BACKGROUND

In a biometric authentication system, biometric information, such as a fingerprint, a palm print, an iris, a retina, a blood vessel image, and a voice print, is used for authentication of a person. Such biometric information may be changed according to the season or the physical condition and aging of a person. When the biometric information is changed, there is a case where a person cannot be correctly authenticated in the biometric authentication system. For example, in the biometric authentication system using a fingerprint as biometric information, there is a case where it is difficult to perform fingerprint collation because, due to the physical condition of a person or the season, the state of the finger surface of the person at the time of collation is changed from the state of the finger surface of the person at the time of the registration.

In order to solve such problem, there have been proposed methods, such as a method (hereinafter referred to as a first conventional method) in which a registered image is selected on the basis of the quality of biometric images at the time of registration, and a method (hereinafter referred to as a second conventional method) in which registered data are replaced by using a biometric image inputted at the time of collation.

PATENT DOCUMENT

[Patent document 1] Japanese Patent Laid-Open No. 2000-20725
[Patent document 2] Japanese Patent Laid-Open No. 2005-202673
[Patent document 3] Japanese Patent Laid-Open No. 2000-30065
[Patent document 4] Japanese Patent Laid-Open No. 2003-36441
[Patent document 5] Japanese Patent Laid-Open No. 2007-11764
[Patent document 6] Japanese Patent Laid-Open No. 11-154230
[Non-Patent document 1] Umut Uludag, Arun Ross, and Anil Jain, "Biometric template selection and update: a case study in fingerprints", Pattern Recognition 37 (2004) 1533-1542, received 23 Jun. 2003 accepted 13 Nov. 2003.

However, the first conventional method of the above-described conventional methods cannot cope with a biological change with the lapse of time or at a specific time, which may result in a case where authentication is difficult to be performed after the lapse of a certain period of time from the registration of biometric information.

Further, in the second conventional method, update processing of registered data is performed at the time of collation, and hence processing other than authentication processing is performed, which results in an increase in the processing load of the biometric authentication system. Further, in order to update the registered data, it is requested that the collation is successfully performed. Therefore, the registered data cannot be updated when a biological change is so large that the collation is not successfully performed.

That is, the conventional biometric information processing method cannot cope with a biological change at a specific time or with the lapse of time, and hence cannot prevent that the authentication accuracy in the biometric authentication system is deteriorated after the lapse of a certain period of time from the time of registration of biometric information.

SUMMARY

In each aspect of the present invention, the following configuration is adopted in order to solve the above-described problems.

A first aspect of the present invention relates to a biometric information processing apparatus. The biometric information processing apparatus according to the first aspect includes: a calculation unit that calculates a direction of each of characteristic lines included in biometric information extracted from a user; smoothing means which smoothes each of the characteristic lines; a difference calculation unit that calculates a difference between the direction of each of the characteristic lines and the direction of each of the smoothed characteristic lines; a detection unit detects, as a change candidate area, a potentially changeable area in the biometric information based on each of the calculated differences; and an estimation unit that estimates the future authentication accuracy using the biometric information, based on the detected change candidate area.

Note that the other aspects of the present invention may be a method and a program which realize the above-described configuration, and may also be a computer-readable storage medium, and the like, in which the program is recorded.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a block diagram illustrating a configuration of a biometric information processing apparatus in Example 3.

DESCRIPTION OF EMBODIMENTS

In the following, a biometric information processing apparatus as an embodiment will be described with reference to specific examples. The biometric information processing apparatus as an embodiment is applied to a part of a system, such as, for example, a biometric authentication system for authenticating a person, and a biometric information management system for managing biometric information of each person. Each of the examples to be described below is merely exemplary, and the present embodiment is not limited by the configurations of the examples.

EXAMPLE 1

Figure 1:
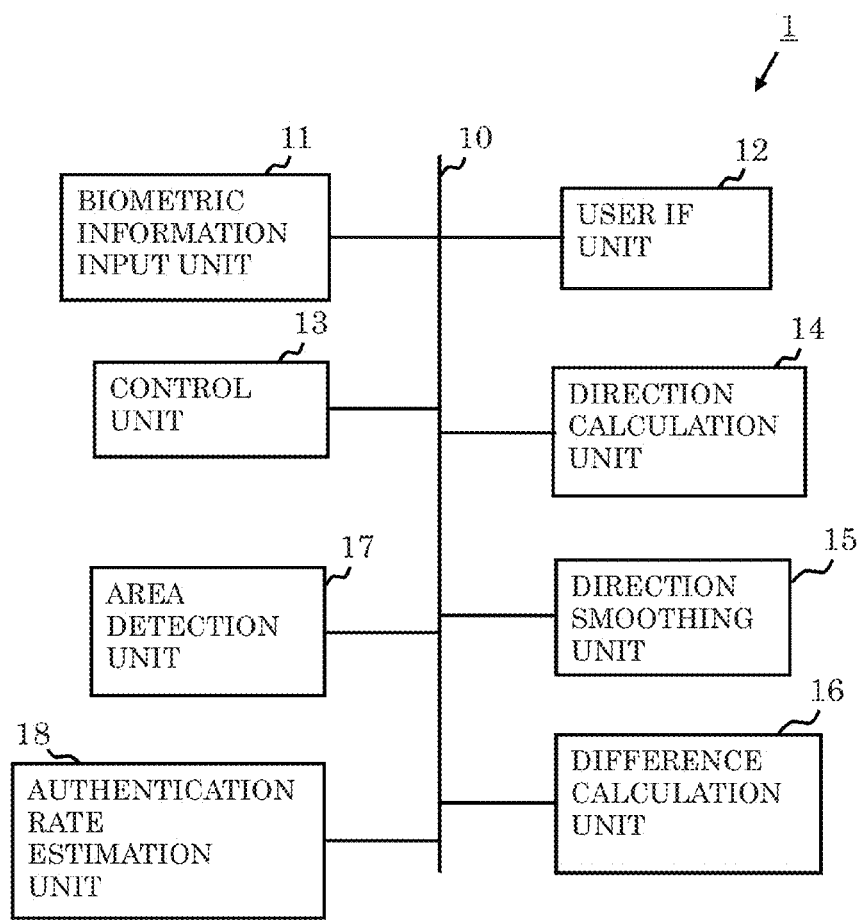
FIG. 1 is a block diagram illustrating a configuration of a biometric information processing apparatus in Example 1.

FIG. 1 is a block diagram illustrating a configuration of a biometric information processing apparatus in Example 1. A biometric information processing apparatus 1 in Example 1 includes a biometric information input unit 11, a user interface (IF) unit 12, a control unit 13, a direction calculation unit 14, a direction smoothing unit 15, a difference calculation unit 16, an area detection unit 17, an authentication rate estimation unit 18, and the like. Each of these units of the biometric information processing apparatus 1 is implemented by a component of software, a component of hardware, or a combination of these components (see the paragraph [others]). These units are connected to be able to communicate with each other. When each of the units is implemented as a hardware component, the units are connected to each other, for example, by a bus 10.

The biometric information input unit 11 reads biometric information from a user, and visualizes the read biometric information. The biometric information input unit 11 is, for example, a sensor which reads biometric information by irradiating an electromagnetic wave to a living body and by detecting a wave reflected by the living body. As a method for reading biometric information, an electrostatic capacitance type, a thermal type, an electric field type, an optical type, and the like, can also be used, and the present embodiment does not limit the method for reading biometric information. Further, a fingerprint, an iris, a retina, a blood vessel image, a voice print, and the like, are used as biometric information. The present embodiment does not limit the kind of biometric information, but in the following, a description is given by taking a fingerprint as an example. The biometric information input unit 11 outputs the visualized biometric information image.

The user IF unit 12 is an apparatus which performs an output to a display apparatus and which receives an input from the user. Examples of the display apparatus include a cathode-ray tube (CRT), a liquid crystal display (LCD), a plasma display panel (PDP), and the like. Under the control of the control unit 13, and the like, the user IF unit 12 makes the display apparatus display data sent from other units. Further, examples of the apparatus for receiving the input include a keyboard, a mouse, and the like. The user IF unit 12 may also be a touch panel in which a display apparatus is integrated with an apparatus for receiving the input.

The control unit 13 controls each of the units. The unit implemented as a component of software may also be configured to be implemented in such a manner that a program read from a storage unit (not illustrated) is executed by the control unit 13.

The direction calculation unit 14 divides the biometric information image outputted from the biometric information input unit 11 into a plurality of blocks having a predetermined size, and calculates a ridge direction θ for each of the blocks. The ridge direction θ is calculated for each of the blocks and hence is local characteristic information. The present embodiment is described by using an example in which a fingerprint is used as the biometric information, and hence the local characteristic information of a fingerprint is described as the ridge direction. However, the ridge direction means the direction of a characteristic line which represents a local characteristic of a biometric information image. For example, the tangential direction of a characteristic line segment of a biometric information image is calculated as the direction of the characteristic line (ridge direction). In the following, there will be described a specific example of a method for calculating a ridge direction in the case where a plurality of blocks are generated by dividing a biometric information image into w in the longitudinal direction (y direction) and into w in the lateral direction (x direction).

The direction calculation unit 14 partially differentiates a block image (i, j) in each of the lateral direction (x direction) and the longitudinal direction (y direction) by applying a primary differential filter, such as a Sobel filter, to the block image (i, j), and obtains differential values of ∂x and ∂y. The direction calculation unit 14 calculates the ridge direction θ (i, j) of the block image by using the following expressions (1), (2) and (3) based on the differential values of ∂x and ∂y. Note that reference symbol (i, j) denotes the position of the block image in the whole biometric information image, and the ridge direction θ (i, j) means the ridge direction calculated for the block image (i, j).

$$\theta(i, j) = \frac{1}{2}\tan^{-1}\left(\frac{V_y(i, j)}{V_x(i, j)}\right) \quad \text{(expression 1)}$$

$$V_x(i, j) = \sum_{u=i-\frac{w}{2}}^{i+\frac{w}{2}} \sum_{v=j-\frac{w}{2}}^{j+\frac{w}{2}} 2\partial_x(u, v)\partial_y(u, v) \quad \text{(expression 2)}$$

$$V_y(i, j) = \sum_{u=i-\frac{w}{2}}^{i+\frac{w}{2}} \sum_{v=j-\frac{w}{2}}^{j+\frac{w}{2}} \partial_x^2(u, v)\partial_y^2(u, v) \quad \text{(expression 3)}$$

The direction calculation unit 14 may also be configured to calculate the ridge direction by using a directional filter, or the like, other than the primary differential filter described above.

By using the ridge directions of the blocks around each block, the direction smoothing unit 15 corrects the ridge direction θ (i, j) calculated for the each block by the direction calculation unit 14. For example, a smoothing mask (filter) is used for this correction. Further, the direction smoothing unit 15 may also be configured to use a smoothing technique in which the flow of the ridge direction is regarded as a line in a phase diagram so as to be modeled by a mathematical expression. In the following, the ridge direction calculated by the direction calculation unit 14 is expressed as $\theta_R$ (i, j), and the ridge direction smoothed by the direction smoothing unit 15 is expressed as $\theta_s$ (i, j).

The difference calculation unit 16 calculates, for each block, a difference between the ridge direction $\theta_R$ (i, j) and the smoothed ridge direction $\theta_s$ (i, j). Generally, the direction information is discontinuous, and hence the difference calculation unit 16 calculates a difference between the ridge direction $\theta_R$ (i, j) and the smoothed ridge direction $\theta_s$ (i, j) after converting the ridge direction $\theta_R$ (i, j) and the smoothed ridge direction $\theta_s$ (i, j) into continuous vector fields, respectively. In the following, the calculated difference value of each block (i, j) is described as $O_Q$ (i, j).

Figure 2:
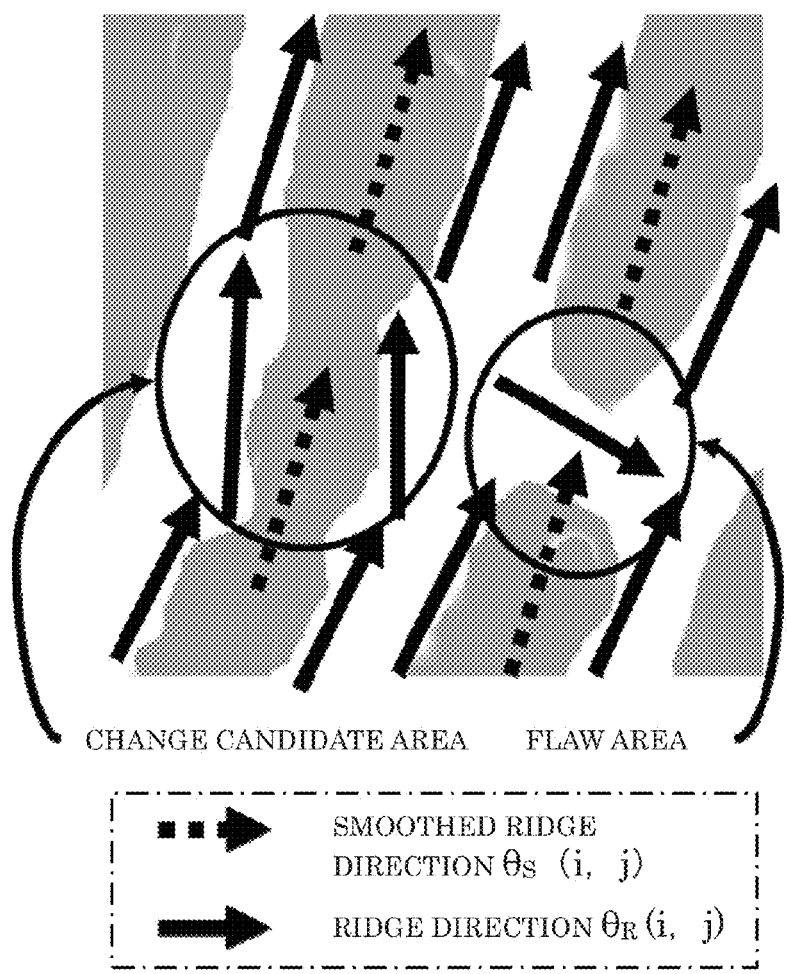
FIG. 2 is a diagram illustrating an area detection in the case where a fingerprint is used as biometric information.

The area detection unit 17 determines a change candidate block from the plurality of blocks on the basis of the difference value calculated for each of the blocks by the difference calculation unit 16. FIG. 2 is a diagram illustrating a concept of area detection in the case where a fingerprint is used as biometric information. As illustrated in FIG. 2, the smoothed ridge direction $\theta_s(i, j)$ is calculated so as to extend along the ridge line regardless of noise appearing in the fingerprint image.

In the biometric information image as illustrated in FIG. 2, the following areas are considered as image areas in which the ridge direction $\theta_R(i, j)$ and the smoothed ridge direction $\theta_s(i, j)$ can be calculated to be different from each other.

An area in which a ridge line is divided by a flaw (hereinafter described as a flaw area).

An area in which a valley line is filled by sweat or a stuck matter so that the ridge lines seem to be connected to each other (hereinafter described as a filled-in area).

An area in which the ridge line abruptly becomes thin or thick (hereinafter described as a change candidate area).

Here, in the flaw area and the filled-in area which are greatly affected by a flaw, sweat, and the like, the ridge direction $\theta_R(i, j)$ is calculated regardless of the original ridge direction and on the basis of the state where the flaw and sweat are formed. Thereby, the ridge direction $\theta_R(i, j)$ is detected in many cases in the state where the ridge direction $\theta_R(i, j)$ is greatly different from the smoothed ridge direction $\theta_s(i, j)$, and hence the calculation result of the ridge direction difference tends to be increased in these areas. The flaw area and the filled-in area are not areas in which the calculation result of the ridge direction difference is changed due to a change in the outside environment, such as a change with the lapse of time and a seasonal change, but are areas in which the calculation result of the ridge direction difference is suddenly changed.

On the other hand, in the change candidate area, division of a ridge line or connection of ridge lines are not caused, and hence the ridge direction $\theta_R(i, j)$ and the smoothed ridge direction $\theta_s(i, j)$ are slightly different from each other but tend to be calculated to be approximately equal to each other. Therefore, the change candidate area rarely adversely affects the authentication performance within a certain fixed period of time from the time of registration of biometric information. However, the change candidate area may be changed to a flaw area or a filled-in area when the biological state is changed according to a change in the outside environment, such as a change with the lapse of time and a seasonal change. When the change candidate area is changed in this way, a large difference is caused between the characteristic amount extracted from the biometric information image at the time of registration, and the characteristic amount extracted from the biometric information image at the time of collation. As a result, it becomes difficult to perform the authentication.

Therefore, the area detection unit 17 detects the block corresponding to the change candidate area, that is, the change candidate block. As described above, in the change candidate area, the difference value $O_Q(i, j)$ is small as compared with the flaw area and the filled-in area and has a certain degree of magnitude. The certain degree of magnitude is a magnitude that can be distinguished from the noise which is generated by the detection method of biometric information and generated in the image processing, and the like. By using a predetermined range in which the difference value $O_Q(i, j)$ can be included, the area detection unit 17 determines a block $(i, j)$ as a change candidate block in the case where the difference value $O_Q(i, j)$ is in the predetermined range.

Figure 3:
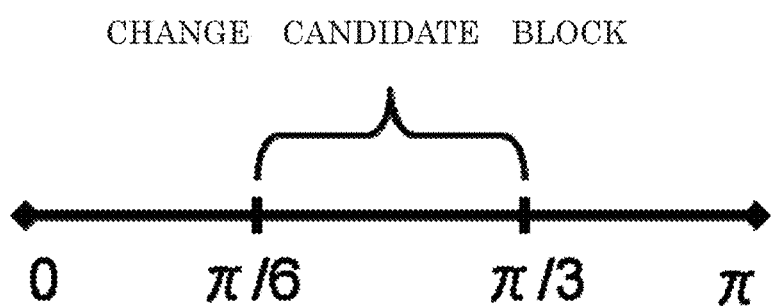
FIG. 3 is a view illustrating a predetermined range used for determining a change candidate block.

The predetermined range used for determining a change candidate block is set, for example, as illustrated in FIG. 3. FIG. 3 is a diagram illustrating a predetermined range used for determining a change candidate block. In the example illustrated in FIG. 3, when the difference value $O_Q(i, j)$ is larger than $\pi/6$ and smaller than $\pi/3$, the block $(i, j)$ is determined as a change candidate block. In the example illustrated in FIG. 3, the area detection unit 17 detects a change candidate block by using the first threshold value of $\pi/6$, and the second threshold value of $\pi/3$. The second threshold value is set to exclude a flaw area and a filled-in area, and the first threshold value is set to exclude noise.

Figure 4:
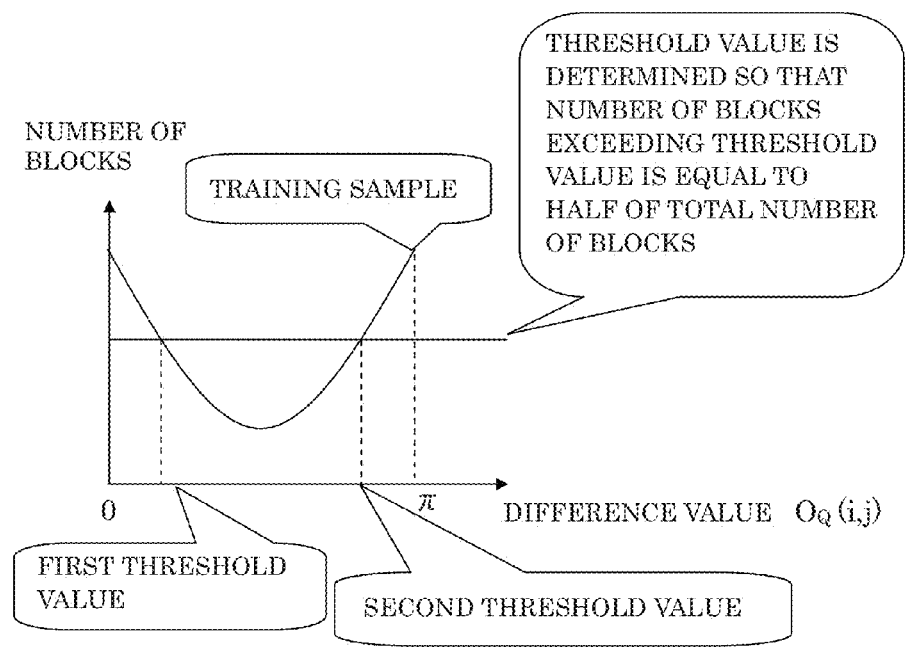
FIG. 4 is a diagram illustrating an example method for determining threshold values used for determining a change candidate block.

These first threshold value and second threshold value are determined, for example, by using some training samples beforehand so that the number of change candidate blocks has a predetermined ratio to the total number of blocks. In the example illustrated in FIG. 4, the first threshold value and the second threshold value are determined so that the number of change candidate blocks is a half of the total number of blocks. FIG. 4 is a diagram illustrating an example method for determining threshold values used for determining a change candidate block.

The authentication rate estimation unit 18 calculates the number $O_{QSUM}$ of change candidate blocks in a target biometric information image, which are detected by the area detection unit 17, and estimates an authentication rate on the basis of the number $O_{QSUM}$ of the change candidate blocks. In the following, the authentication rate estimated by the authentication rate estimation unit 18 is described as an estimated authentication rate. In the present embodiment, the authentication rate is merely described as an indicator representing estimated authentication accuracy, and hence the authentication rate described here is not limited to the meaning of an actual authentication rate, such as a false acceptance rate and a false rejection rate. The estimated authentication rate is reduced as the number $O_{QSUM}$ of change candidate blocks is increased. This is because, since the change candidate area is an area which may be changed to a flaw area and a filled-in area according to a change in the outside environment, such as a change with the lapse of time, and a seasonal change, the possibility of decrease in the authentication rate becomes high in the case where the number of change candidate blocks is large, that is, where the change candidate area is large.

The authentication rate estimation unit 18 acquires an estimated authentication rate, for example, by the following expression.

Estimated authentication rate=max(1−*a*×the number of change candidate blocks/total number of blocks,0)

Here, max (A, B) is a function which selects a larger value between A and B. The constant a is an adjustment value which is determined beforehand by using training samples, and the like, and is set to 1 in the case where the number of change candidate blocks is directly reflected in the estimated authentication rate.

The estimated authentication rate acquired by the authentication rate estimation unit 18 may be successively stored or may be outputted to the display apparatus of the user IF unit 12.

[Operation Example]

Figure 5:
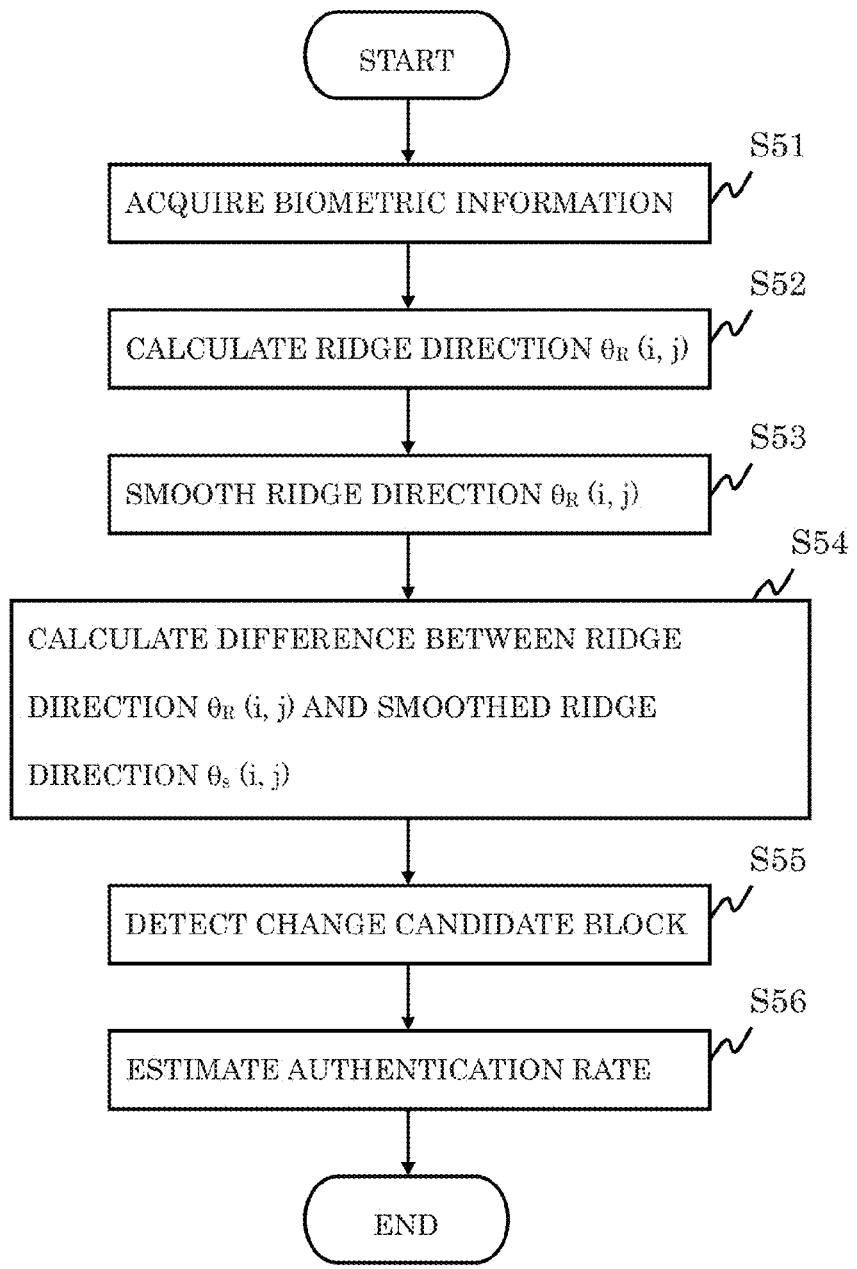
FIG. 5 is a flow chart illustrating an example of an operation of the biometric information processing apparatus in Example 1.

FIG. 5 is a flow chart illustrating an example of an operation of the biometric information processing apparatus in Example 1. In the biometric information processing apparatus in Example 1, the biometric information input unit 11 first acquires biometric information from a user (S51). The biometric information input unit 11 outputs a biometric information image by visualizing the acquired biometric information.

In the direction calculation unit 14, the biometric information image outputted from the biometric information input unit 11 is divided into a plurality of blocks having a predetermined size, and a ridge direction $\theta_R (i, j)$ is calculated for each block (i, j) (S52). The direction smoothing unit 15 smoothes each of the ridge directions $\theta_R (i, j)$ calculated by the direction calculation unit 14 (S53). The difference calculation unit 16 calculates, for each of the blocks, a difference $O_Q(i,j)$ between the ridge direction $\theta_R (i, j)$ and the smoothed ridge direction $\theta_s (i, j)$ (S54).

The area detection unit 17 determines whether or not each difference $O_Q (i, j)$ calculated for each of the blocks (i, j) by the difference calculation unit 16 is included in a predetermined range. The predetermined range is set, for example, to a range which is larger than a first threshold value and which is smaller than a second threshold value. The area detection unit 17 determines, as a change candidate block, the block (i, j) in which the difference $O_Q (i, j)$ is included in the predetermined range (S55).

The authentication rate estimation unit 18 estimates an authentication rate on the basis of the number of the change candidate blocks detected by the area detection unit 17 (S56).

In this way, in the biometric information processing apparatus 1 in Example 1, a biometric information image formed by visualizing biometric information is divided into a plurality of blocks, and a change candidate block is detected on the basis of the direction of the characteristic line of each of the blocks. In other words, a local area, in which biometric information may be greatly changed due to a future change in the biological state, is detected as a change candidate block.

In Example 1, an authentication rate (authentication accuracy) is estimated on the basis of the number of change candidate blocks detected in this way, that is, the size of the change candidate area. That is, the estimated authentication rate acquired in Example 1 includes the susceptibility of the read biometric information to a change, and hence can be said to provide an estimation of a future authentication rate. Therefore, with the biometric information processing apparatus 1 in Example 1, it is possible to determine the stability of authentication of biometric information by utilizing the acquired estimated authentication rate, and hence it is possible to prevent the deterioration of authentication accuracy after the lapse of a certain period of time.

EXAMPLE 2

Figure 6:
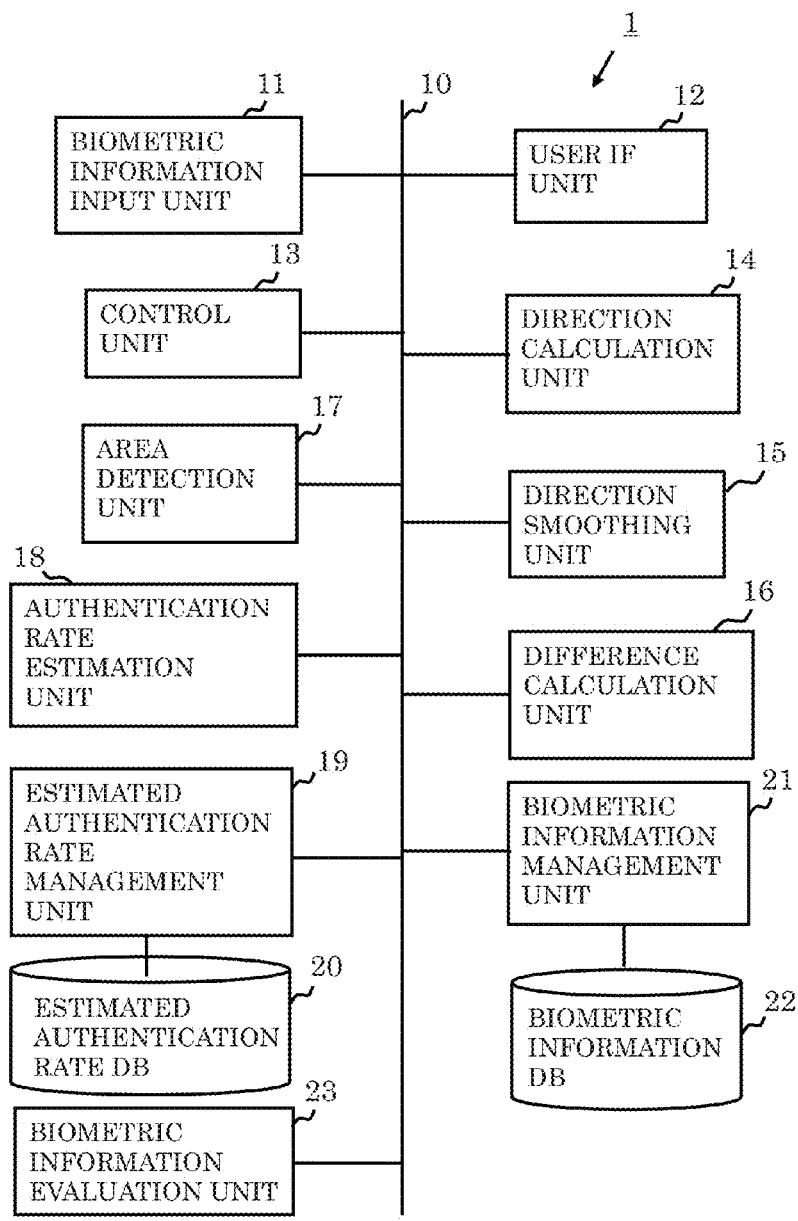
FIG. 6 is a block diagram illustrating a configuration of a biometric information processing apparatus in Example 2.

In Example 2, there is described an example in which the estimated authentication rate acquired by the above-described method in Example 1 is used for evaluating biometric information acquired to be registered. FIG. 6 is a block diagram illustrating a configuration of a biometric information processing apparatus in Example 2.

In addition to the configuration of Example 1, the biometric information processing apparatus 1 in Example 2 further includes an estimated authentication rate management unit 19, an estimated authentication rate database (DB) 20, a biometric information management unit 21, a biometric information database (DB) 22, a biometric information evaluation unit 23, and the like. Each of these units of the biometric information processing apparatus 1 is implements by a component of software, a component of hardware, or a combination of these components (see the paragraph [others]). These units are connected to be able to communicate with each other. When each of the units is implemented as a hardware component, the units are connected to each other, for example, by the bus 10. In the following, portions different from Example 1 will be mainly described.

The control unit 13 makes a user control the user IF unit 12 to thereby perform a registration procedure of biometric information. In the registration procedure of biometric information, the user is requested to perform an input operation of biometric information a predetermined number of times $TH_{INPUT}$ (for example, 5 times), and according to the results of the operations, the biometric information of the user is registered in the biometric information DB 22. When the control unit 13 detects that the biometric information is inputted into the biometric information input unit 11, the control unit 13 counts the number times of the input. When the counted number is larger than the predetermined threshold value $TH_{INPUT}$, the control unit 13 notifies the excess of the counted number over the predetermined threshold value to the biometric information evaluation unit 23. In response to the notification, the biometric information evaluation unit 23 evaluates the target biometric information. The control unit 13 receives, from the biometric information evaluation unit 23, an instruction based on the evaluation result, and makes a predetermined screen displayed during the registration procedure.

The estimated authentication rate management unit 19 manages the estimated authentication rate determined by the authentication rate estimation unit 18. The estimated authentication rate management unit 19 receives, from the authentication rate estimation unit 18, the estimated authentication rate determined on the basis of the biometric information inputted at the time of the registration procedure of biometric information, and stores the estimated authentication rate in the estimated authentication rate DB 20 at each reception of the estimated authentication rate. Thereby, a plurality of the estimated authentication rates corresponding to the predetermined number of times of acquisition for each user are stored in the estimated authentication rate DB 20, respectively. At this time, the plurality of estimated authentication rates is stored in the estimated authentication rate DB 20 in association with a user ID for identifying the user.

The biometric information management unit 21 manages the biometric information data about each of the authorized users. Specifically, in the registration processing of a user whose identity is authenticated, the biometric information management unit 21 receives a biometric information image which is acquired from the user and which is outputted from the biometric information input unit 11, and then stores the biometric information image in the biometric information DB 22 together with the user ID used for identifying the user. Note that the information stored in the biometric information DB 22 may also be configured to include not only the biometric information image but also the coordinate information, the characteristic point information, and the like, which are acquired from the biometric information. Note that the biometric authentication processing using the biometric information image is performed by the other unit (not illustrated). In the present embodiment, the biometric authentication processing itself is not limited, and hence the general processing may be performed.

The biometric information evaluation unit 23 evaluates the biometric information of each user on the basis of the estimated authentication rate managed by the estimated authentication rate management unit 19. The biometric information evaluation unit 23 performs predetermined processing to cope with the evaluation result. When the biometric information evaluation unit 23 receives the notification that the biometric information of a user to be registered is inputted the predetermined number of times $TH_{INPUT}$, the biometric information evaluation unit 23 evaluates the biometric information of the user to be registered.

When evaluating the biometric information, the biometric information evaluation unit 23 requests, from the estimated authentication rate management unit 19, the estimated authentication rates relating to the user who is to be registered and is the provider of the biometric information. When receiving the plurality of estimated authentication rates relating to the user to be registered, the biometric information evaluation unit 23 calculates statistic values of the plurality of estimated authentication rates on the basis of the estimated authentication rates. As the statistic values, values such as, for example, an average value, a variance value, and a value relating to a predetermined threshold value, are used. As the value relating to the predetermined threshold value, for example, the number of estimated authentication rates included in the history of the estimated authentication rates and exceeding a predetermined permissible authentication rate is used.

When, on the basis of the calculated statistic values of the estimated authentication rates, the biometric information evaluation unit 23 determines that the estimated authentication rates are stable and high, the biometric information evaluation unit 23 determines that the processing to cope with the evaluation result need not be performed. Specifically, when the average value of the estimated authentication rates is larger than a threshold value $TH_{AVE}$, and when the variance value of the estimated authentication rates is a threshold value $TH_{VAR}$ or less, the biometric information evaluation unit 23 determines that the estimated authentication rates are high and stable. In this case, the biometric information evaluation unit 23 requests the biometric information management unit 21 to store, in the biometric information DB 22, any one of the data of biometric information inputted the predetermined number of times $TH_{INPUT}$. Note that, when the second conventional method described in connection with the background art is used, it may also be configured such that the biometric information data stored in the biometric information DB 22 are updated by the second conventional method.

When the biometric information evaluation unit 23 determines that the estimated authentication rates are low and unstable, the biometric information evaluation unit 23 determines that re-registration based on different biometric information is to be performed as the processing to cope with the evaluation result. Specifically, in the case where the average value of the estimated authentication rates is the threshold value $TH_{AVE}$ or less, where the variance value of the estimated authentication rates is larger than the threshold value $TH_{VAR}$, and where the number of estimated authentication rates exceeding the predetermined permissible authentication rate is a threshold value $TH_{CNT}$ or less, the biometric information evaluation unit 23 determines, as described above, that the estimated authentication rates are low and unstable.

When determining that the re-registration based on different biometric information is to be performed, the biometric information evaluation unit 23 instructs the estimated authentication rate management unit 19 to delete, from the estimated authentication rate DB 20, the estimated authentication rates about the user to be registered. Further, the biometric information evaluation unit 23 requests the control unit 13 to make a screen displayed for urging the user to again perform the registration procedure based on different biometric information. Thereby, for example, when a fingerprint is used as the biometric information, a screen, which urges the user to use a finger different from the finger used in the present registration procedure, is displayed by the display apparatus. Further, when a palm print and a blood vessel image are used as the biometric information, the user is urged to register the biometric information of another hand.

In the case other than the above-described two cases, that is, in the case where the estimated authentication rates are high but are not stable, and where the estimated authentication rates are low but are not unstable, the biometric information evaluation unit 23 decides that the estimated authentication rates are to be re-evaluated. This decision is based on the determination that the values of the estimated authentication rates are deteriorated due to the influence of the manner of reading the biometric information (the manner of placing the finger, or the like) in the registration procedure at this time.

When determining that the estimated authentication rates are to be re-evaluated, the biometric information evaluation unit 23 instructs the estimated authentication rate management unit 19 to delete, from the estimated authentication rate DB 20, the estimated authentication rates about the user to be registered. Further, the biometric information evaluation unit 23 requests the control unit 13 to make a screen displayed for urging the user to again perform the registration procedure based on the same biometric information. This screen displays, for example, a comment of "properly place a living body at the time of reading biometric information". Note that it may also be configured such that, when the determination of the re-evaluation is repeated for the same user the number of times equal to a predetermined threshold value, the biometric information evaluation unit 23 determines that re-registration based on different biometric information is to be performed.

[Operation Example]

Figure 7:
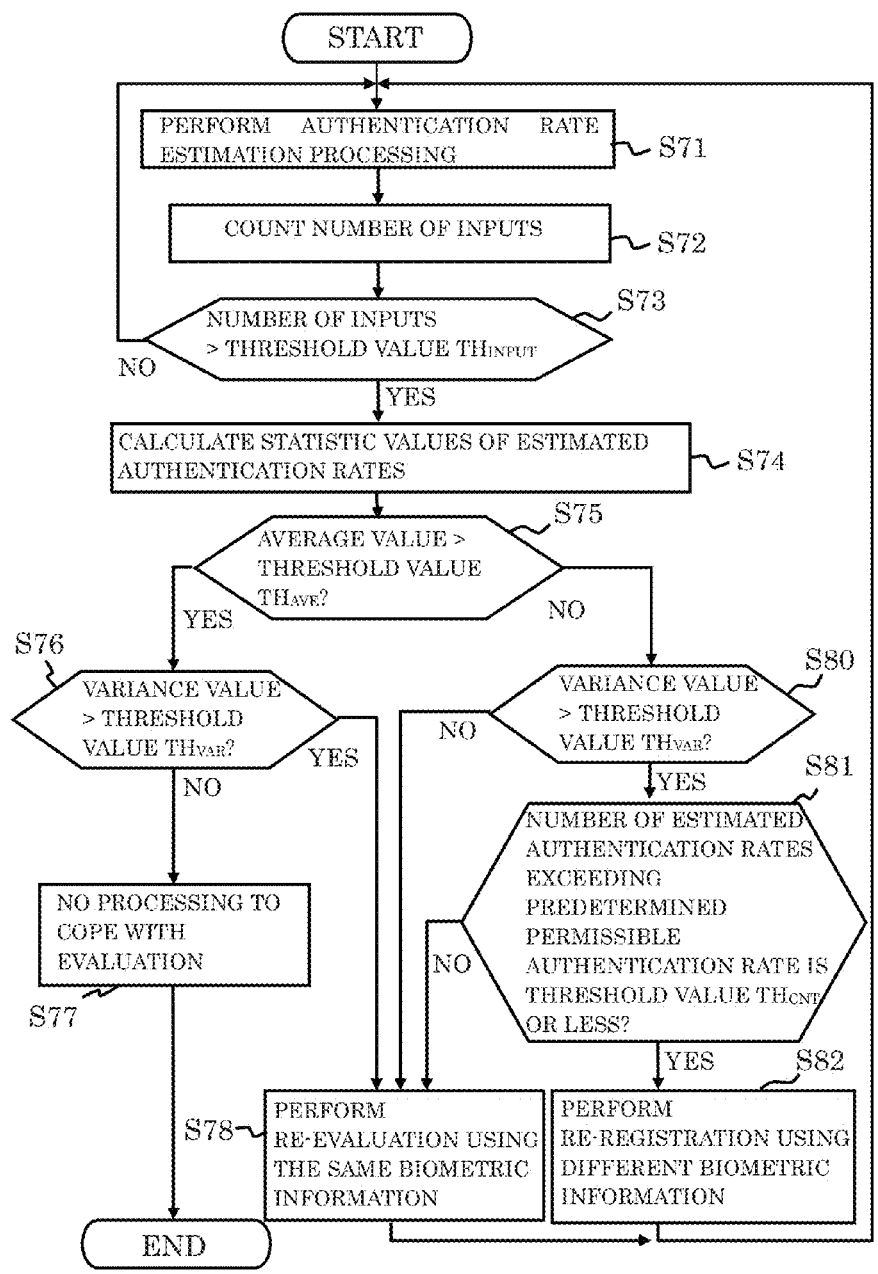
FIG. 7 is a flow chart illustrating an example of an operation of the biometric information processing apparatus in Example 2.

FIG. 7 is a flow chart illustrating an example of an operation of the biometric information processing apparatus in Example 2.

In the biometric information registration procedure, when each of the steps illustrated in FIG. 5 described above is performed, the biometric information of the user to be registered is acquired, and the estimated authentication rate of the acquired biometric information is calculated (S71). The calculated estimated authentication rate is stored in the estimated authentication rate DB 20 together with the user ID indicating the user to be registered.

When the control unit 13 detects that the biometric information is inputted into the biometric information input unit 11, the control unit 13 counts the number of input times of the biometric information (S72). The control unit 13 determines whether or not the counted number of input times exceeds the predetermined threshold value $TH_{INPUT}$ (S73). The control unit 13 repeats the above-described steps (S71 and S72) until the number of input times exceeds the predetermined threshold value $TH_{INPUT}$. When the number of input times exceeds the predetermined threshold value $TH_{INPUT}$ (S73; YES), the control unit 13 notifies the excess of the number of input times over the predetermined threshold value $TH_{INPUT}$ to the biometric information evaluation unit 23.

When receiving this notification, the biometric information evaluation unit 23 requests, from the estimated authentication rate management unit 19, all the stored estimated authentication rates about the user to be registered. In response to this request, the estimated authentication rate management unit 19 extracts the estimated authentication rates of the user to be registered from the estimated authentication rate DB 20, and sends the plurality of extracted estimated authentication rates to the biometric information evaluation unit 23. The number of the estimated authentication rates extracted here is the same as the predetermined threshold value $TH_{INPUT}$ described above.

On the basis of the plurality of estimated authentication rates sent from the estimated authentication rate management unit 19, the biometric information evaluation unit 23 calculates statistic values of the estimated authentication rates (S74). Specifically, an average value, a variance value, and the number of estimated authentication rates exceeding the predetermined permissible authentication rate are calculated. In Example 2, three values of the average value, the variance value, and the number of estimated authentication rates exceeding the predetermined permissible authentication rate are used as the statistic values of the estimated authentication rates, but at least one of these three values may be used, or the other statistic value may also be used.

The biometric information evaluation unit 23 first determines whether or not the average value is larger than the predetermined threshold value $TH_{AVE}$ (S75). Then, the biometric information evaluation unit 23 determines whether or not the variance value is larger than the predetermined threshold value $TH_{VAR}$ (S76 and S80). When the biometric information evaluation unit 23 determines that the average value is larger than the predetermined threshold value $TH_{AVE}$ (S75; YES) and that the variance value is smaller than the predetermined threshold value $TH_{VAR}$ (S76; NO), the biometric information evaluation unit 23 determines that no processing to cope with the evaluation result is necessary (S77). In this case, the biometric information evaluation unit 23 requests the biometric information management unit 21 to store, in the biometric information DB 22, any one of the data of biometric information inputted at the predetermined number of times $TH_{INPUT}$. Thereby, the biometric information registration procedure for the user to be registered is completed.

When the biometric information evaluation unit 23 determines that the average value is not larger than the predetermined threshold value $TH_{AVE}$ (S75; NO), and that the variance value is larger than the predetermined threshold value $TH_{VAR}$ (S76; YES), the biometric information evaluation unit 23 further determines whether or not the number of estimated authentication rates larger than the predetermined permissible authentication rate is the predetermined threshold value $TH_{CNT}$ or less (S81). In the case where the average value does not exceed the predetermined threshold value $TH_{AVE}$ (S75; NO), where the variance value is larger than the predetermined threshold value $TH_{VAR}$ (S76; YES), and where the number of estimated authentication rates larger than the predetermined permissible authentication rate is the predetermined threshold value $TH_{CNT}$ or less (S81; YES), the biometric information evaluation unit 23 determines that re-registration based on different biometric information is to be performed (S82).

When determining that re-registration based on different biometric information is to be performed, the biometric information evaluation unit 23 instructs the estimated authentication rate management unit 19 to delete, from the estimated authentication rate DB 20, the estimated authentication rates about the user to be registered. Further, the biometric information evaluation unit 23 requests the control unit 13 to make a screen displayed for urging the user to perform the re-registration procedure based on different biometric information. Thereby, the registration procedure is resumed by using a living body different from the living body (for example, a finger) used in the previous registration procedure (returning to S71). Subsequently, in the registration procedure using the different biometric information, when it is determined that the statistic values of the estimated authentication rates are high and stable (S75; YES and S76; NO), the different biometric information is registered in the biometric information DB 22 (S77).

In the case where the average value is larger than the predetermined threshold value $TH_{AVE}$ (S75; YES), and where the variance value is larger than the predetermined threshold value $TH_{VAR}$ (S76; YES), and in the case where the average value does not exceed the predetermined threshold value $TH_{AVE}$ (S75; NO), and where the variance value does not exceed the predetermined threshold value $TH_{VAR}$ (S80; NO), the biometric information evaluation unit 23 determines that the estimated authentication rates are to be re-evaluated on the basis of the same biometric information (S78). Further, also in the case where the average value does not exceed the predetermined threshold value $TH_{AVE}$ (S75; NO), where the variance value is larger than the predetermined threshold value $TH_{VAR}$ (S80; YES), and where the number of estimated authentication rates larger than the predetermined permissible authentication rate is larger than the predetermined threshold value $TH_{CNT}$ (S81; NO), the biometric information evaluation unit 23 similarly determines that the estimated authentication rates are to be re-evaluated on the basis of the same biometric information (S78).

When determining that the estimated authentication rates are to be re-evaluated, the biometric information evaluation unit 23 instructs the estimated authentication rate management unit 19 to delete, from the estimated authentication rate DB 20, the estimated authentication rates about the user to be registered. Further, the biometric information evaluation unit 23 requests the control unit 13 to make a screen displayed for urging the user to again perform the registration procedure based on the same biometric information. Thereby, the registration procedure is resumed by using the same living body as the living body (for example, a finger) used in the previous registration procedure (returning to S71). Subsequently, in the re-registration procedure, when it is determined that the statistic values of the estimated authentication rates are high and stable (S75; YES and S76; NO), the biometric information acquired in the re-registration procedure is registered in the biometric information DB 22 (S77).

In this way, in the biological information processing apparatus 1 in Example 2, when biometric information of a user is registered, estimated authentication rates are respectively calculated by the same method as the method in Example 1 on the basis of a plurality of data of biometric information acquired from the user to be registered. In Example 2, statistic values of the plurality of estimated authentication rates calculated in this way are calculated, and the biometric information acquired for registration is evaluated on the basis of the statistic values.

As described above, the estimated authentication rate (estimated authentication accuracy) calculated in the present embodiment includes the susceptibility of the read biometric information to a change, and hence indicates the stability in authentication of the biometric information. In Example 2, the biometric information to be registered is evaluated by using the estimated authentication rates, and according to the evaluation result, it is determined whether or not the biometric information acquired for registration is to be actually registered. Depending on the evaluation result, the registration procedure is again performed.

Therefore, with Example 2, it is possible to register biometric information having high authentication stability, and hence it is possible to prevent the deterioration of the authentication accuracy after the lapse of a certain period of time from the time of registration of the biometric information.

EXAMPLE 3

In Example 3, the estimated authentication rates acquired by the method in Example 1 described above are corrected by taking actual authentication rates into consideration. FIG. 8 is a block diagram illustrating a configuration of a biometric information processing apparatus in Example 3.

In addition to the configuration of Example 2, the biometric information processing apparatus 1 in Example 3 further includes an authentication rate calculation unit 81, an estimated authentication rate correction unit 82, and the like. Each of these units of the biometric information processing apparatus 1 is implemented by a component of software, a component of hardware, or a combination of these components (see the paragraph [others]). These units are connected to be able to communicate with each other. When each of the units is implemented as a hardware component, the units are connected to each other, for example, by the bus 10. In the following, portions different from Examples 1 and 2 will be mainly described.

The authentication rate calculation unit 81 calculates actual authentication rates on the basis of the history of the results of processing of authentication between the biometric information data registered in the biometric information DB 22 in the authentication processing unit (not illustrated), and the biometric information inputted into the biometric information input unit 11. The authentication rate calculation unit 81 calculates a value by dividing the number of times of successful authentication by the total number of times of authentication, and sets the value as an actual authentication rate. The authentication rate calculation unit 81 calculates an actual authentication rate each time the authentication is performed.

The estimated authentication rate correction unit 82 corrects the estimated authentication rate determined by the authentication rate estimation unit 18 by using the actual authentication rate calculated by the authentication rate calculation unit 81, and sends the corrected estimated authentication rate to the estimated authentication rate management unit 19. As a result, the corrected estimated authentication rate is stored in the estimated authentication rate DB 20.

Specifically, the estimated authentication rate correction unit 82 calculates an estimated authentication rate by using, as represented in the following expression (4), the estimated authentication rate estimated at this time by the authentication rate estimation unit 18, the previously estimated authentication rate which relates to the user to be registered and which is stored in the estimated authentication rate DB 20, and the actual authentication rate calculated by the authentication rate calculation unit 81. In the following expression (4), "pred [n]" denotes the estimated authentication rate at this time, "pred [n−1]" denotes the previously estimated authentication rate, and "actual" denotes the actual authentication rate. The estimated authentication rate "pred [n]" represented in the left side of the following expression (4) denotes the corrected estimated authentication rate.

$$pred[n] = \frac{actual}{pred[n]} \times (pred[n] - pred[n-1]) \quad \text{(expression 4)}$$

The estimated authentication rate correction unit 82 may be configured to perform the correction processing of the estimated authentication rate each time an estimated authentication rate is acquired by the authentication rate estimation unit 18, or may also be configured to perform the correction processing in the case where the difference between the actual authentication rate and the estimated authentication rate becomes larger than a predetermined threshold value.

In this way, with Example 3, the actual authentication rate is reflected in the estimated authentication rate, and hence it is possible to improve the accuracy of the estimated authentication rate. When it is possible to improve the accuracy of the estimated authentication rate, it is possible to accurately determine the stability in the authentication of biometric information. As a result, it is possible to improve the certainty of preventing deterioration of the authentication accuracy after the lapse of a certain period of time.

[Others]

With each of the above-described examples, it is possible to provide a biometric information processing technique which prevents the deterioration of the authentication accuracy due to a biological change.

<Regarding Hardware Component and Software Component>

The hardware component is a hardware circuit, examples of which include a field programmable gate array (FPGA), an application specific integrated circuit (ASIC), a gate array, a combination of logical gates, a signal processing circuit, and an analog circuit.

The software component is a part (piece) that implements the above described processes as software, and is not a concept that limits a language, a development environment and the like that implement the software. Examples of the software component include a task, a process, a thread, a driver, firmware, a database, a table, a function, a procedure, a subroutine, a predetermined part of a program code, a data structure, an array, a variable, and a parameter. These software components are implemented on one or more memories (one or more processors (for example, CPUs, DSPs (Digital Signal Processor) or the like).

Note that each embodiment described above does not limit an approach for implementing the processing units described above. The processing units may be configured as the above described hardware component or software component, or the combination thereof, according to an approach that can be implemented by a person of ordinary skill in the art.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more the embodiment(s) of the present invention have been described in detail, it should be understood that the various changes, substitutions, and alterations could be made hereto without departing from the spirit and scope of the invention.

What is claimed is:

1. A biometric information processing apparatus comprising:
    a calculation unit that calculates a direction of each of characteristic lines included in biometric information extracted from a user;
    a smoothing unit that smoothes each of the characteristic lines;
    a difference calculation unit that calculates a difference between the direction of each of the characteristic lines and a direction of each of the smoothed characteristic lines;
    a detection unit that detects, as a change candidate area, a potentially changeable area in the biometric information based on each of the calculated differences; and an estimation unit that estimates a future authentication accuracy using the biometric information based on the detected change candidate area.

2. The biometric information processing apparatus according to claim 1, wherein
the calculation unit divides, into a plurality of areas, the whole living body area included in the biometric information, and calculates a characteristic line direction for each of the divided areas.

3. The biometric information processing apparatus according to claim 2, wherein
the detection unit determines, according to the differences, whether or not each of the divided areas is a change candidate area, and
the estimation unit uses the number of the areas determined as the change candidate areas to estimate the future authentication accuracy using the biometric information.

4. The biometric information processing apparatus according to claim 1, further comprising:
a storage unit that stores each authentication accuracy information representing authentication accuracy that is estimated by the estimation unit in association with each of data of biometric information acquired a plurality of times when registering the biometric information of the user; and
an evaluation unit that evaluates the biometric information acquired from the user for registration, according to the plurality of data of authentication accuracy information about the user which are stored in the storage unit.

5. The biometric information processing apparatus according to claim 1, further comprising:
an authentication rate calculation unit that calculates an actual authentication rate based on a history of results of actual authentication processing about the user; and
a correction unit that corrects the authentication accuracy estimated by the estimation unit, by reflecting the actual authentication rate calculated by the authentication rate calculation unit in the information about the authentication accuracy estimated by the estimation unit.

6. A biometric information processing method executed by a computer, the biometric information processing method comprising:
calculating a direction of each of characteristic lines included in biometric information extracted from a user;
smoothing each of the characteristic lines;
calculating a difference between the direction of each of the characteristic lines and a direction of each of the smoothed characteristic lines;
detecting, as a change candidate area, a potentially changeable area in the biometric information based on each of the calculated differences; and
estimating a future authentication accuracy using the biometric information, based on the detected change candidate area.

* * * * *